US011549436B2

(12) United States Patent
Anglin et al.

(10) Patent No.: US 11,549,436 B2
(45) Date of Patent: Jan. 10, 2023

(54) SECONDARY FLOW OIL SEPARATOR

(71) Applicant: Raytheon Technologies Corporation, Farmington, CT (US)

(72) Inventors: Christopher T. Anglin, Manchester, CT (US); Heriberto Rodriguez, Moca, PR (US)

(73) Assignee: Raytheon Technologies Corporation, Farmington, CT (US)

(*) Notice: Subject to any disclaimer, the term of this patent is extended or adjusted under 35 U.S.C. 154(b) by 463 days.

(21) Appl. No.: 16/856,304

(22) Filed: Apr. 23, 2020

(65) Prior Publication Data
US 2021/0332753 A1    Oct. 28, 2021

(51) Int. Cl.
*B01D 45/14* (2006.01)
*F01D 25/18* (2006.01)
*F16N 39/00* (2006.01)
*F02C 7/06* (2006.01)
*F02C 7/32* (2006.01)

(52) U.S. Cl.
CPC ............... *F02C 7/06* (2013.01); *B01D 45/14* (2013.01); *F01D 25/183* (2013.01); *F02C 7/32* (2013.01); *F16N 39/002* (2013.01); *F05D 2260/98* (2013.01)

(58) Field of Classification Search
CPC ... B01D 45/14; F05D 2260/98; F01D 25/183; F16N 39/002; F16H 57/0421; F16H 57/0423; F16H 57/0427; F16H 57/0431; F02C 7/32
USPC ................................. 184/6.11, 6.22
See application file for complete search history.

(56) References Cited

U.S. PATENT DOCUMENTS

| 8,991,557 | B2 * | 3/2015 | Arisawa | ................... | F02C 7/32 |
| | | | | | 184/6.12 |
| 8,994,557 | B2 | 3/2015 | Arisawa et al. | | |
| 9,810,312 | B2 | 11/2017 | Obayashi et al. | | |
| 10,197,150 | B2 | 2/2019 | Anglin et al. | | |
| 11,073,043 | B2 * | 7/2021 | Guillemont | ......... | F16H 57/0423 |
| 2018/0023684 | A1 | 1/2018 | Anglin | | |

(Continued)

FOREIGN PATENT DOCUMENTS

EP          3330573 B1    2/2020
WO    WO2018189476 A1    10/2018

OTHER PUBLICATIONS

Extended European Search Report dated Oct. 28, 2021, received for corresponding European Application No. 21168457.6.

*Primary Examiner* — Michael R Mansen
*Assistant Examiner* — Mark K Buse
(74) *Attorney, Agent, or Firm* — Kinney & Lange, P.A.

(57) ABSTRACT

An assembly for a compartment of a gas turbine engine that includes a housing, a gear, and a baffle disposed about the gear. The baffle includes an upstream portion and a downstream portion. The upstream portion includes an upstream inner wall and an upstream outer wall separated from the gear. The upstream inner wall is positioned between the upstream outer wall and the gear. An upstream flow channel is formed between the upstream inner wall and the upstream outer wall. The downstream portion of the baffle includes a downstream inner wall and a downstream outer wall separated from the gear. The downstream inner wall is positioned between the downstream outer wall and the gear. A downstream flow channel is formed between the downstream outer wall and the downstream inner wall.

15 Claims, 4 Drawing Sheets

(56) References Cited

U.S. PATENT DOCUMENTS

2018/0187770 A1* 7/2018 Anglin .................... F02C 7/32
2018/0320779 A1  11/2018 Kaemmerer et al.

* cited by examiner

SECONDARY FLOW OIL SEPARATOR

BACKGROUND

In general, the present disclosure relates to gears in an engine. In particular, the present disclosure relates to a baffle of a gear compartment in a gas turbine engine.

Gas turbine engines typically include a transmission system and/or gear compartments for driving various elements of the engine and attached components. Such transmission and gear systems can include gears mounted to various rotating shafts. To provide cooling and lubricating functionality, oil or lubricant is often distributed into the transmission and gear compartments to wet various components.

As a gear rotates within a bearing compartment or gearbox of the engine, a volume of air adjacent the gear is accelerated radially outward from the tangentially slower-velocity inner diameter ("ID") portion of the gear to the tangentially higher-velocity outer diameter ("OD") portion of the gear and gear rim. As the air moves radially outward, other air is drawn to an ID portion of the gear to replace the radially outward moving air. This motion creates a secondary flow circulation such that air from the rim of the gear is drawn back into the ID of the gear where the air then repeats the cycle.

During this circulation, the air can carry oil with it. As this oil impinges upon the gear, it can cause parasitic losses and excess heating. Additionally, the oil can enter the gear mesh between the gears, causing further heating and energy loss as the oil is pumped between the gear teeth. This can also result in increased oil aeration, increased engine oil gulp, and reduced scavenge system efficiency that can affect engine thrust specific fuel consumption and performance.

SUMMARY

An assembly for a compartment of a gas turbine engine that includes a housing, a gear, and a baffle disposed about the gear. The baffle includes an upstream portion and a downstream portion. The upstream portion includes an upstream inner wall and an upstream outer wall separated from the gear. The upstream inner wall is positioned between the upstream outer wall and the gear. An upstream flow channel is formed between the upstream inner wall and the upstream outer wall. The downstream portion of the baffle includes a downstream inner wall and a downstream outer wall separated from the gear. The downstream inner wall is positioned between the downstream outer wall and the gear. A downstream flow channel is formed between the downstream outer wall and the downstream inner wall.

A method of managing air and oil within a bearing compartment of a gas turbine engine includes rotating a gear of the gas turbine engine about a centerline axis. A first flow circulation is guided with an upstream portion of a baffle to a web of the gear. The baffle is disposed about the gear and includes an upstream portion and a downstream portion. The upstream portion disposed on an upstream side of the gear and includes an upstream inner wall and an upstream outer wall. The upstream outer wall is separated from the gear and the upstream inner wall is positioned between the upstream outer wall and the gear. The upstream inner wall and the upstream outer wall form an upstream flow channel therebetween. The downstream portion disposed on a downstream side of the gear opposite from the upstream portion and is connected to the upstream portion. The downstream portion includes a downstream outer wall and a downstream inner wall. The downstream outer wall is separated from the gear. The downstream inner wall is positioned between the downstream outer wall and the gear. The downstream outer wall and the downstream inner wall of the downstream portion form a downstream flow channel therebetween. A second flow circulation is guided with the downstream portion of the baffle to the web of the gear. The first flow circulation is directed radially outward long the gear towards a radially outward end of the gear. The second flow circulation is directed radially outward along the gear towards the radially outward end of the gear.

The present summary is provided only by way of example, and not limitation. Other aspects of the present disclosure will be appreciated in view of the entirety of the present disclosure, including the entire text, claims, and accompanying figures.

Figure 1:
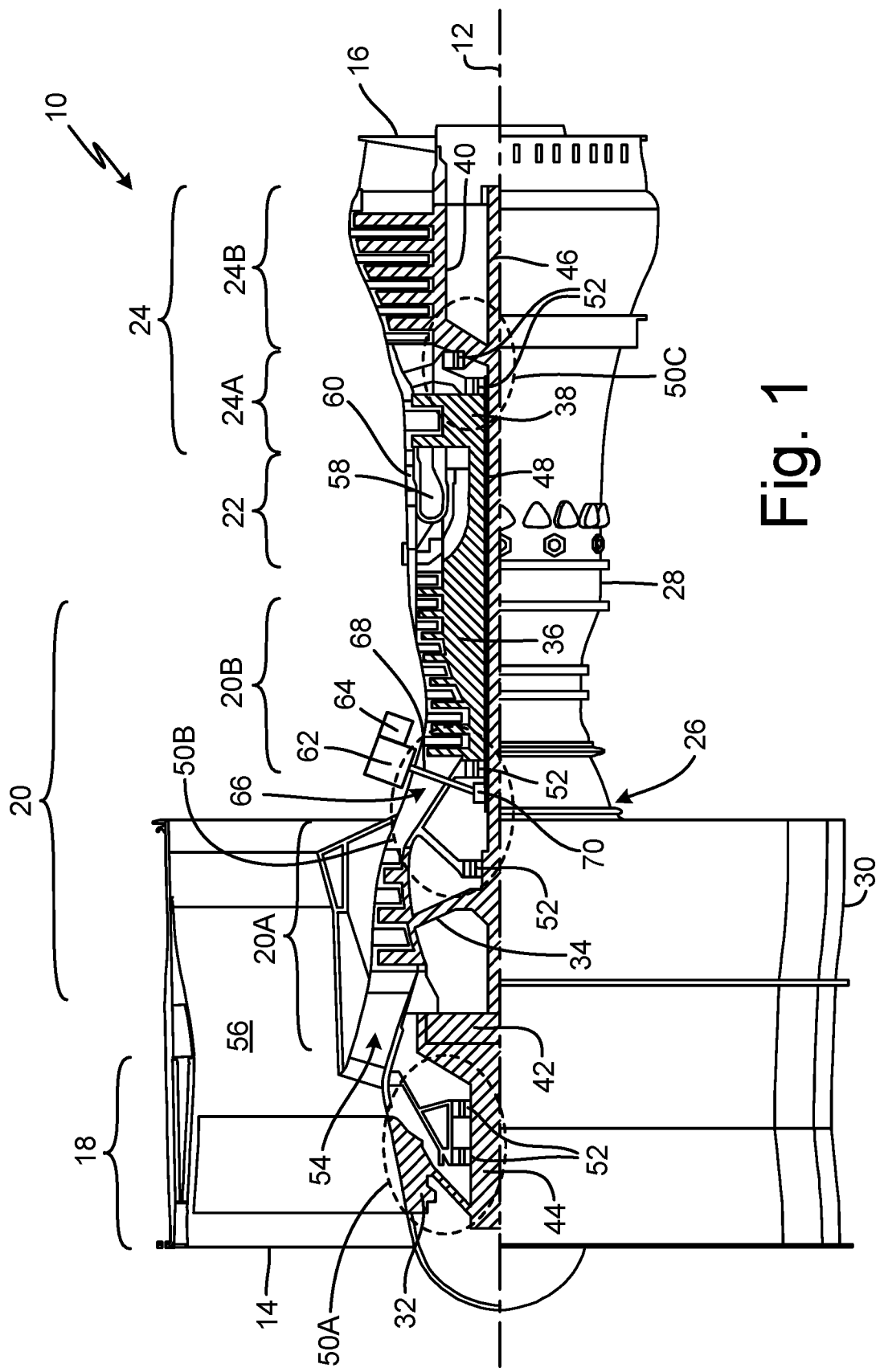
FIG. 1 is a side elevation cutaway view of a gas turbine engine.

While the above-identified figures set forth one or more embodiments of the present disclosure, other embodiments are also contemplated, as noted in the discussion. In all cases, this disclosure presents embodiments by way of representation and not limitation. It should be understood that numerous other modifications and embodiments can be devised by those skilled in the art, which fall within the scope and spirit of the principles of the disclosure. The figures may not be drawn to scale, and applications and embodiments of the present disclosure may include features and components not specifically shown in the drawings.

DETAILED DESCRIPTION

FIG. 1 shows a side elevation cutaway view of gas turbine engine 10 and includes axial centerline 12, upstream airflow inlet 14, downstream airflow exhaust 16, fan section 18, compressor section 20 (with low pressure compressor ("LPC") section 20A and high pressure compressor ("HPC") section 20B), combustor section 22, turbine section 24 (with high pressure turbine ("HPT") section 24A and low pressure turbine ("LPT") section 24B), engine housing 26 (with inner case 28 (e.g., a core case) and outer case 30 (e.g., a fan case)), fan rotor 32, LPC rotor 34, HPC rotor 36, HPT rotor 38, LPT rotor 40, gear train 42, fan shaft 44, low speed shaft 46, high speed shaft 48, bearing compartments 50A, 50B, and 50C, plurality of bearings 52, core gas path 54, bypass gas path 56, combustion chamber 58, combustor 60, accessory gearbox 62, gearbox attachments 64, transmission system 66, tower shaft 68, and geared assembly 70.

Gas turbine engine 10 extends along axial centerline 12 between upstream airflow inlet 14 and downstream airflow exhaust 16. Gas turbine engine 10 includes fan section 18, compressor section 20, combustor section 22, and turbine section 24. Compressor section 20 includes LPC section 20A and HPC section 20B. Turbine section 24 includes HPT section 24A and LPT section 24B.

Fan section 18, compressor section 20, combustor section 22, and turbine section 24 are arranged sequentially along centerline 12 within engine housing 26. Engine housing 26 includes inner case 28 (e.g., a core case) and outer case 30 (e.g., a fan case). Inner case 28 may house one or more of fan section 18, compressor 20, combustor section 22, and turbine section 24 (e.g., an engine core). Outer case 30 may house at least fan section 18. Each of gas turbine engine sections 18, 20A, 20B, 24A and 24B includes respective rotors 32-40. Each of these rotors 32-40 includes a plurality of rotor blades arranged circumferentially around and connected to one or more respective rotor disks. The rotor blades, for example, may be formed integral with or mechanically fastened, welded, brazed, adhered and/or otherwise attached to respective rotor disks.

Fan rotor 32 is connected to gear train 42, for example, through fan shaft 44. Gear train 42 and LPC rotor 34 are connected to and driven by LPT rotor 40 through low speed shaft 46. The combination of at least LPC rotor 34, LPT rotor 40, and low speed shaft 46 may be referred to as "a low speed spool." HPC rotor 36 is connected to and driven by HPT rotor 38 through high speed shaft 48. The combination of at least HPC rotor 36, HPT rotor 38, and high speed shaft 48 may be referred to as "a high speed spool." Shafts 44-48 are rotatably supported by a plurality of bearings 52, which can be rolling element bearings, thrust bearings, or other types of bearings. Each of these bearings 52 is connected to engine housing 26 by at least one stationary structure such as, for example, an annular support strut.

During operation, air enters gas turbine engine 10 through airflow inlet 14. Air is directed through fan section 18 and is then split into either core gas path 54 or bypass gas path 56. Core gas path 54 flows sequentially through fan section 18, compressor section 20, combustor section 22, and turbine section 24. The air within core gas path 54 may be referred to as "core air." Bypass gas path 56 flows through a duct between inner case 28 and outer case 30. The air within bypass gas path 56 may be referred to as "bypass air."

The core air is compressed by LPC rotor 34 and HPC rotor 36 and directed into combustion chamber 58 of combustor 60 in combustor section 22. Fuel is injected into combustion chamber 58 and mixed with the core air that has been compressed by compressor section 20 to provide a fuel-air mixture. This fuel-air mixture is ignited, and combustion products thereof expand and flow through and sequentially cause HPT rotor 38 and LPT rotor 40 to rotate. The rotations of HPT rotor 38 and LPT rotor 40 drive rotation of LPC rotor 34 and HPC rotor 36, respectively and compression of the air received from core gas path 54. The rotation of LPT rotor 40 also drives rotation of fan rotor 32, which propels bypass air through and out of bypass gas path 56. The propulsion of the bypass air may account for a majority of thrust generated by gas turbine engine 10, which can be more than 75% of engine thrust. Gas turbine engine 10 of the present disclosure, however, is not limited to the foregoing exemplary thrust ratio.

Gas turbine engine 10 of FIG. 1 also includes accessory gearbox 62, one or more gearbox attachments 64 and transmission system 66 in a mid-bearing compartment between LPC section 20A and HPC section 20B. Accessory gearbox 62 is mounted to inner case 28. However, in alternative embodiments, accessory gearbox 62 may be mounted elsewhere with gas turbine engine 10, such as to outer case 30. Accessory gearbox 62 is configured to transfer rotational energy (e.g., torque) between transmission system 66 and the one or more gearbox attachments 64. An example of an accessory gearbox is disclosed in U.S. Pat. No. 9,068,515 to Duong et al., which is assigned to the assignee of the present application. Examples of a gearbox attachment may include an air turbine starter, a de-oiler, a hydraulic pump, an oil pump, an integrated drive generator, a permanent magnet alternator and a fuel pump module. The present disclosure is not limited to including the foregoing exemplary types or configurations of accessory gearbox 62 or gearbox attachments 64.

Transmission system 66 is configured to mechanically couple and thereby transfer rotational energy (e.g., torque) between a rotating assembly (or component) of gas turbine engine 10 and accessory gearbox 62. In particular, transmission system 66 of FIG. 1 mechanically couples one of the low speed spool or high-speed spool of gas turbine engine 10 to the accessory gearbox 62. Transmission system 66 includes high speed shaft 48, tower shaft 68, and geared assembly 70.

Figure 2A:
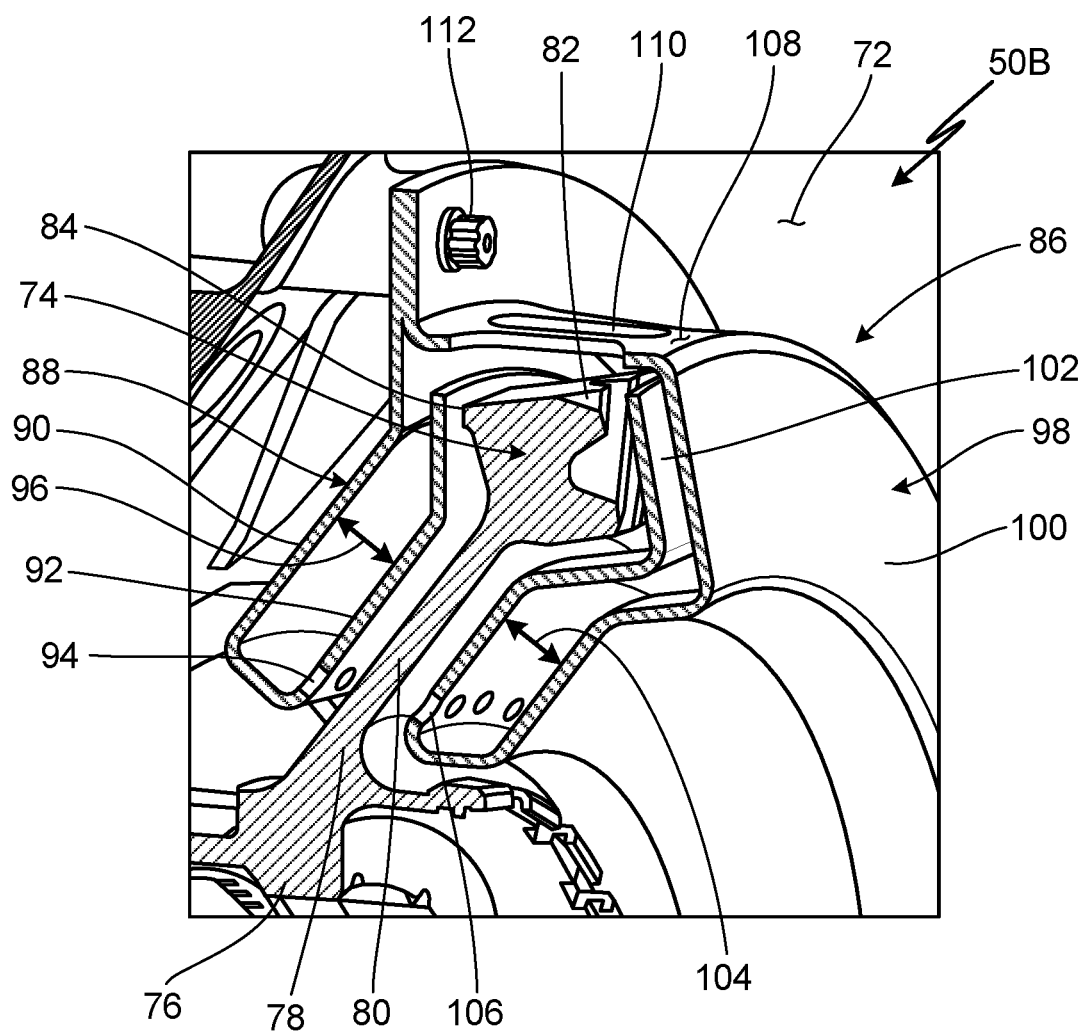
FIG. 2A is a perspective cross-section view of a geared system with a baffle of the gas turbine engine.

FIG. 2A is a perspective cross-section view of a portion of bearing compartment 50B and shows housing 72, gear 74 (with hub 76, web 78, intermediate portion 80, teeth 82, and radially outward end 84), baffle 86 with upstream portion 88 (including upstream outer wall 90, upstream inner wall 92, upstream openings 94, and upstream flow channel 96) and downstream portion 98 (including downstream outer wall 100, downstream inner wall 102, downstream flow channel 104, and downstream openings 106), annular band 108 with slots 110, and fastener 112. In this example, the terms "upstream" and "downstream" refer to a direction of the flow of air through a flowpath of gas turbine engine 10. In FIG. 2A, the flow of air relative to gear 74 is left to right, thereby orienting an upstream direction to the left of gear 74 and a downstream direction to the right of gear 74 in FIG. 2A.

Housing 72 is a wall that forms a boundary of bearing compartment 50B. Gear 74 is a circular wheel configured to rotate about a centerline axis. Hub 76 is a center disk portion of gear 74. Web 78 is a transition portion of gear 74 and is located radially between hub 76 and intermediate portion 80. Intermediate portion 80 is a circular ribbon of solid material. In this example, a shape of intermediate portion 80 is frustoconical. In another example, intermediate portion 80 can include a flat, disc-like shape. Teeth 82 are extensions of solid material. Radially outward end 84 is a radially outward end located along a circumference of gear 74.

Baffle 86 is a device for restraining the flow of a fluid such as air or oil (e.g., lubricant or coolant). Upstream portion 88 and downstream portion 98 are portions of baffle 86. Upstream outer wall 90, upstream inner wall 92, downstream outer wall 100, and downstream inner wall 102 are annular sheets of solid material. Upstream openings 94 and downstream openings 106 are slots or holes. Upstream flow channel 96 and downstream flow channel 104 are channels configured to provide for fluid flow paths. Annular band 108 is an annular ribbon or sheet of solid material. Slots 110 are holes or openings. In another example, slots 110 can include a single annular slot that extends a full circumference of annular band 108. In this example, fastener 112 is a bolt. In other examples, fastener can be a rivet or another type of mechanical fastener.

Housing 72 is disposed to form an exterior boundary of bearing compartment 50B. Gear 74 is disposed on and is configured to rotate about axial centerline 12. In this example, hub 76 is connected or attached to either low speed shaft 46 or high speed shaft 48, with momentary reference to FIG. 1. Web 78 is integrally formed with and extends between hub 76 and intermediate portion 80. Intermediate portion 80 is integrally formed with and extends between web 78 and teeth 82. Teeth 82 are connected to and extend from radially outward end 84 of gear 74.

Baffle 86 is disposed in bearing compartment 50B to surround gear 74. Baffle is affixed to housing 72 by fastener 112. Upstream portion 88 is disposed on an upstream side of gear 74. In this example, the upstream side of gear 74 is located to the left of gear 74 as shown in FIG. 2A. Upstream outer wall 90 is positioned axially upstream from gear 74 and from upstream inner wall 92. Upstream outer wall 90 is connected to upstream inner wall 92 at a radially inward point of upstream inner wall 92. Upstream inner wall 92 is positioned between gear 74 and upstream outer wall 90 and is adjacent to an upstream face of gear 74. As shown in this example, upstream inner wall 92 can include a shape that matches a contour of an upstream face of gear 74. Upstream openings 94 are disposed in a radially inward portion of upstream inner wall 92. Upstream openings 94 fluidly connect upstream flow channel with gear 74. Upstream flow channel 96 is formed between upstream outer wall 90 and upstream inner wall 92. In this example, upstream flow channel 96 extends 360° around an upstream side of gear 74 to form an annular gap between upstream outer wall 90 and upstream inner wall 92.

Downstream portion 98 is disposed on a downstream side of gear 74. In this example, the downstream side of gear 74 is located to the right of gear 74 as shown in FIG. 2A. Downstream outer wall 100 is positioned axially downstream from gear 74 and from downstream inner wall 102. Downstream outer wall 100 is connected to downstream inner wall 102 at a radially inward point of downstream inner wall 102. Downstream inner wall 102 is positioned between gear 74 and downstream outer wall 100 and is adjacent to a downstream face of gear 74. As shown in this example, downstream inner wall 102 can include a shape that matches a contour of a downstream face of gear 74. Downstream flow channel 104 is formed between downstream outer wall 100 and downstream inner wall 102. In this example, downstream flow channel 104 extends 360° around a downstream side of gear 74 to form an annular gap between downstream outer wall 100 and downstream inner wall 102. Downstream openings 106 are disposed in a radially inward portion of downstream inner wall 102. Downstream openings 106 fluidly connect downstream flow channel with gear 74.

Annular band 108 is disposed radially outward from and surrounds radially outward end 84 of gear 74. Annular band 108 is connected to and extends between radially outward ends of upstream outer wall 90 and downstream outer wall 100. Slots 110 are disposed in and extend through annular band 108. Slots 110 fluidly connect gear 74 to bearing compartment 50B. In this example, slots 110 are aligned along a radial direction with radially outward end 84 of gear 74. Fastener 112 passes through portions of upstream portion 88 and downstream portion 98 of baffle 86 and is received within a receptacle disposed in housing 72.

Housing 72 contains gear 74, baffle 86, and other components within bearing compartment 50B. Housing 72 also provides structural support and a mounting surface for baffle 86. Gear 74 in order to transfer and/or receive torque and to drive another rotary component of gas turbine engine 10. As gear 74 rotates, secondary flow circulations form on the upstream and downstream sides of gear 74. Hub 76 provides structural support for web 78, intermediate portion 80, and teeth 82 of gear 74. Teeth 82 engage or mesh with another toothed element of gas turbine engine 10.

As will be discussed further with reference to FIG. 2B, baffle 86 guides and directs upstream and downstream secondary flow circulations within upstream portion 88 and downstream portion 98 of baffle 86. Baffle 86 substantially prevents gear 74 from being impinged by or otherwise receiving additional lubricant that is churning or otherwise moving around bearing compartment 50B. Such additional lubricant, if allowed to impinge upon gear 74, can increases windage within bearing compartment 50B and decreases the efficiency of gas turbine engine 10 due to the contact between lubricant and gear 74. For example, upstream flow channel 96 formed between upstream outer wall 90 and upstream inner wall 92 of upstream portion 88 transports a flow of air that is part of a secondary flow circulation from teeth 82 back down to web 78 of gear 74. Likewise, downstream flow channel 104 formed between downstream outer wall 100 and downstream inner wall 102 of downstream portion 98 transports a flow of air that is part of another secondary flow circulation from teeth 82 back down to web 78 of gear 74.

Upstream outer wall 90 contains the flow of air within upstream flow channel 96 as well as blocks oil inside of bearing compartment 50B from impinging onto gear 74. Upstream inner wall 92 provides a physical barrier that, along with upstream outer wall 90, forms upstream flow channel 96. Upstream openings 94 allow an opening through which air flows from upstream flow channel 96 to gear 74. Upstream flow channel 96 transports air flow from radially outward end 84 of gear 74 radially inward to upstream openings 94 in upstream inner wall 92. Downstream outer wall 100 contains a flow of air within downstream flow channel 104 as well as blocks oil inside of bearing compartment 50B from impinging onto gear 74. Downstream inner wall 102 provides a physical barrier that, along with downstream outer wall 100, forms downstream flow channel 104. Downstream flow channel 104 transports air flow from radially outward end 84 of gear 74 radially inward to downstream openings 106 in downstream inner wall 102. Downstream openings 106 allow an opening through which air flows from downstream flow channel 104 to gear 74.

Annular band 108 provides structural support between upstream portion 88 and downstream portion 98 of baffle 86. Slots 110 provide an exit path for oil shed from radially outward end 84 of gear 74, from baffle 86. Slots 110 are configured to allow lubricant to flow through slots 110 and into bearing compartment 50B. Slots 110 allow for lubricant to be transported away from gear 74. Transporting lubricant away from gear 74 decreases windage of the lubricant within baffle 86 as well as impingement of the lubricant back onto gear 74 thereby increasing the efficiency of gas turbine engine 10.

Figure 2B:
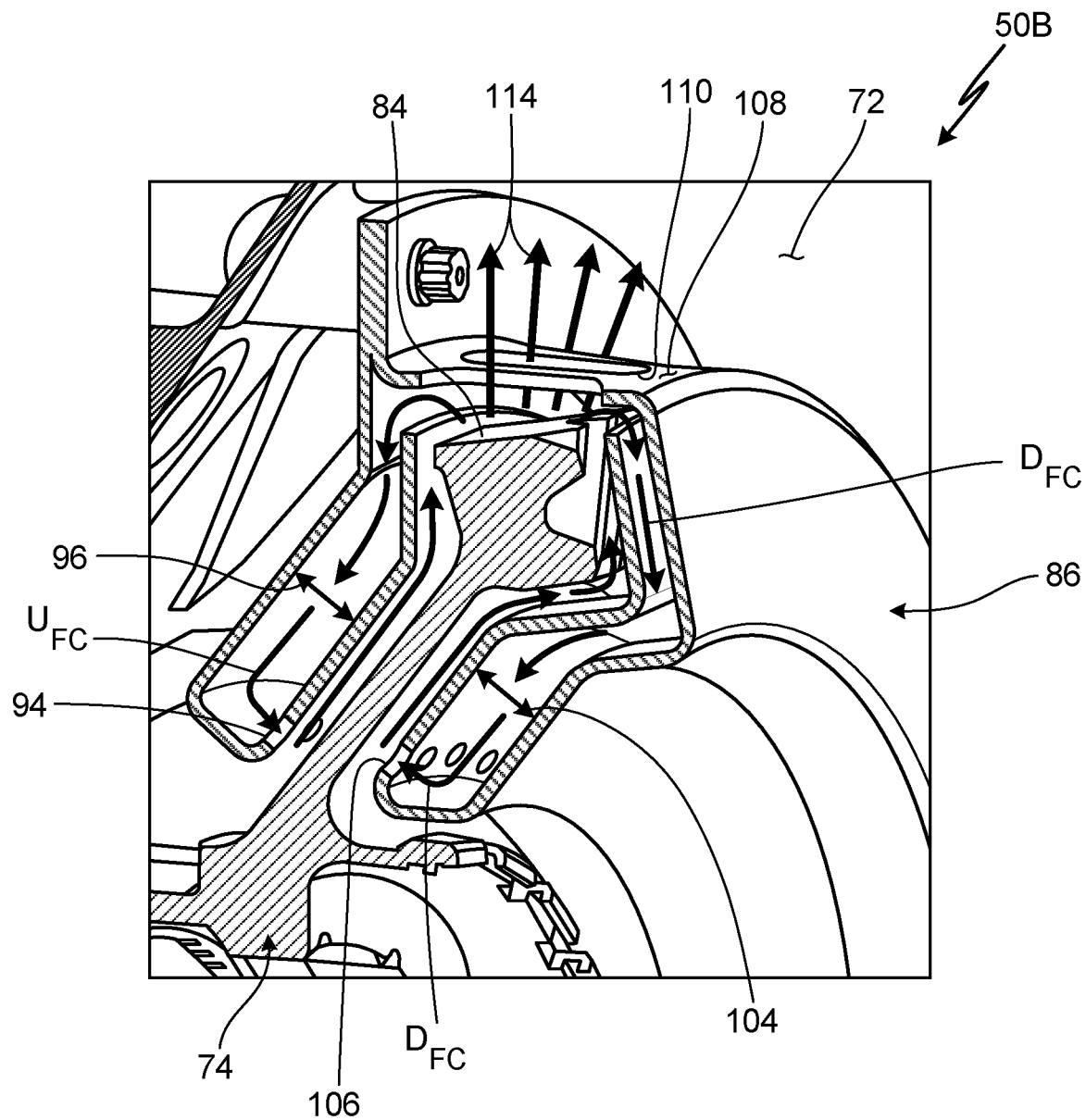
FIG. 2B is a perspective cross-section view of the geared system and shows flow paths of air and of oil.

FIG. 2B is a perspective cross-section view of gear 74 and baffle 86 and shows housing 72, gear 74 (with radially outward end 84), baffle 86 (with upstream openings 94, upstream flow channel 96, downstream flow channel 104, and downstream openings 106), annular band 108 (with slots 110), upstream flow circulation $U_{FC}$, downstream flow circulation $D_{FC}$, and oil 114.

Upstream flow circulation $U_{FC}$ and downstream flow circulation $D_{FC}$ are air flow vortices created in response to the rotation of gear 74. Oil 114 is a coolant and/or lubricant used to cool and/or lubricate components within bearing compartment 50B. Slots 110 allow oil 114, which is being shed from radially outward end 84 of gear 74, an exit path. At either side of radially outward end 84 of gear 74, a circumferential slot is configured to allow some secondary airflow from radially outward end 84 of gear 74 to pass into. This secondary airflow created by the revolution of gear 74 in turn creates upstream flow circulation $U_{FC}$, downstream flow circulation $D_{FC}$.

Upstream flow circulation $U_{FC}$ and downstream flow circulation $D_{FC}$ are directed radially inward by baffle 86 to upstream openings 94 and downstream openings 106 where upstream flow circulation $U_{FC}$ and downstream flow circulation $D_{FC}$ are allowed to return to gear 74 and once again accelerated radially outward. Since oil 114 has greater momentum than the air, due to its greater mass, oil 114 is less likely to be able to change directions and become entrained in either upstream flow circulation $U_{FC}$ or downstream flow circulation $D_{FC}$. The momentum of oil 114 causing oil 114 to being flung off of gear 74 and out of slots 110 acts to separate a majority of oil 114 from both upstream flow circulation $U_{FC}$ and downstream flow circulation $D_{FC}$.

Here, the use of baffle 86 provides the benefits of a reduction in heat generation within bearing compartment 50B. Baffle 86 helps to reduce the mechanical system impact on the thrust specific fuel consumption of gas turbine engine 10. Baffle 86 improves scavenging of oil 114 and improves the quality of oil 114 that is scavenged (from a lower volume of air being mixed with oil 114).

Figure 3B:
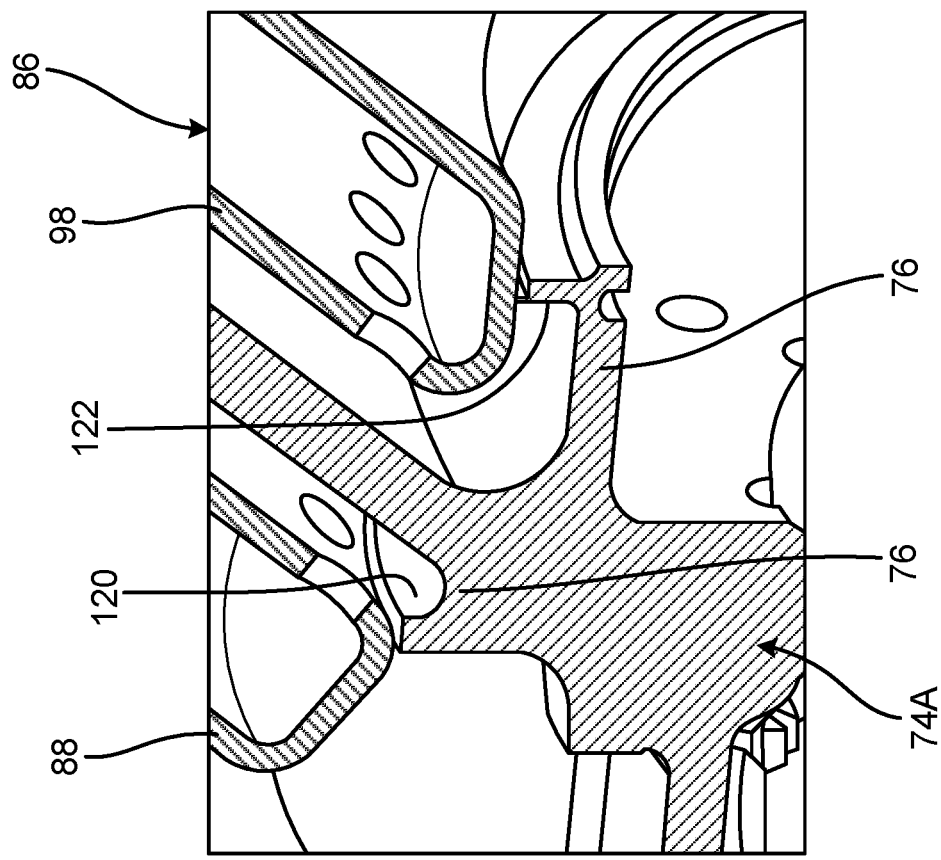
FIG. 3B is a perspective cross-section view of the baffle and an alternate gear wheel including an annular flange.
Figure 3A:
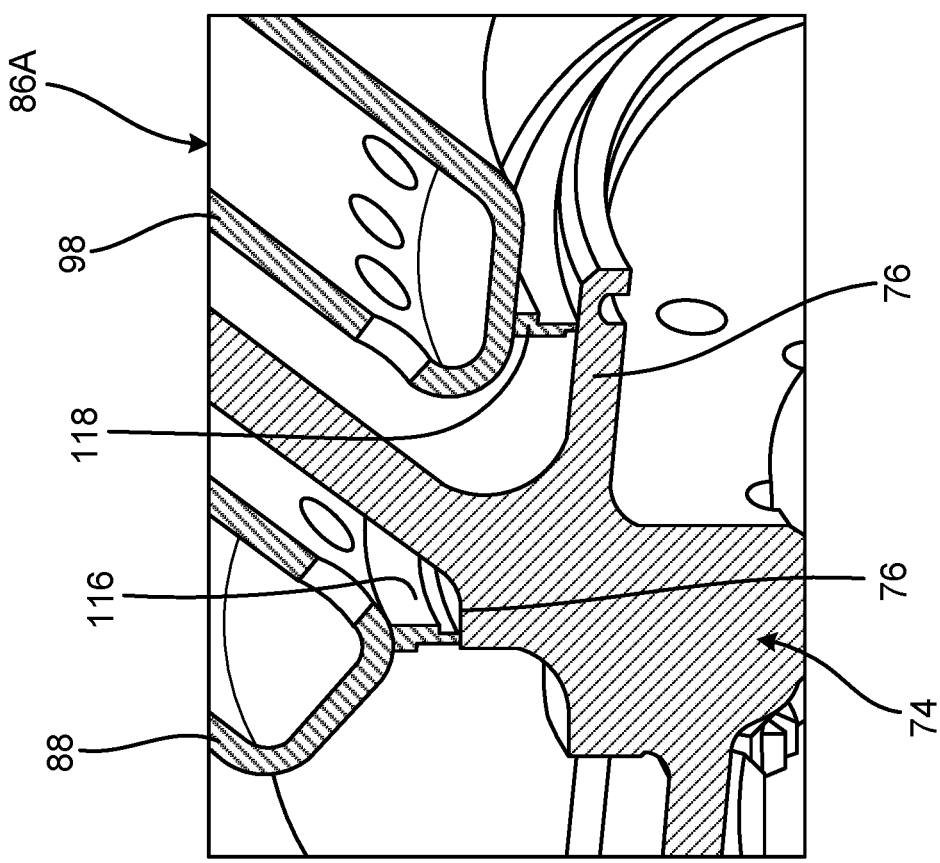
FIG. 3A is a perspective cross-section view of an alternate baffle with an annular flange.

FIG. 3A is a perspective cross-section view of baffle 86A and shows gear 74 (with hub 76) and baffle 86A (with upstream portion 88, downstream portion 98, upstream flange 116, and downstream flange 118).

Upstream flange 116 and downstream flange 118 are annular flanges. In one example, upstream flange 116 and/or downstream flange 118 can include a flow discourager of another type of secondary seal such as a brush seal or an abradable seal. Upstream flange 116 is connected to and extends radially inward from upstream portion 88 of baffle 86A. Upstream flange 116 extends towards hub 76 of gear 74 such that a radially inner end of upstream flange 116 is in contact with or is close to hub 76. Downstream flange 118 is connected to and extends radially inward from downstream portion 98 of baffle 86A. Downstream flange 118 extends towards hub 76 of gear 74 such that a radially inner end of downstream flange 118 is in contact with or is close to hub 76.

Upstream flange 116 and downstream flange 118 form a sealing interface with hub 76 of gear 74 so as to prevent additional oil from within bearing compartment 50B from entering into baffle 86A. Upstream flange 116 and downstream flange 118 can also improve the effectiveness of the air circulation(s) (e.g., upstream flow circulation $U_{FC}$ and downstream flow circulation $D_{FC}$) within the double-walled portions of baffle 86A.

FIG. 3B is a perspective cross-section view of gear 74A and shows (with hub 76, upstream flange 120, and downstream flange 122) and baffle 86A (with upstream portion 88 and downstream portion 98).

Upstream flange 120 and downstream flange 122 are annular flanges. In one example, upstream flange 120 and/or downstream flange 122 can include a flow discourager of another type of secondary seal such as a brush seal or an abradable seal. Upstream flange 120 is connected to and extends radially inward from an upstream portion of hub 76. Upstream flange 120 extends towards upstream portion 88 such that a radially outer end of upstream flange 120 is in contact with or is close to upstream portion 88. Downstream flange 122 is connected to and extends radially outward from a downstream portion of hub 76. Downstream flange 122 extends towards downstream portion 98 such that a radially outer end of downstream flange 122 is in contact with or is close to downstream portion 98.

Upstream flange 120 and downstream flange 122 form a sealing interface with upstream portion 88 and downstream portion 98, respectively of baffle 86 so as to prevent additional oil from within bearing compartment 50B from entering into baffle 86. Upstream flange 120 and downstream flange 122 can also improve the effectiveness of the air circulation(s) (e.g., upstream flow circulation $U_{FC}$ and downstream flow circulation $D_{FC}$) within the double-walled portions of baffle 86 by preventing ambient air from within bearing compartment 50B from being drawn into to the first and second flow circulations.

Discussion of Possible Embodiments

An assembly for a compartment of a gas turbine engine that includes a housing, a gear, and a baffle disposed about the gear. The baffle includes an upstream portion and a downstream portion. The upstream portion includes an upstream inner wall and an upstream outer wall separated from the gear. The upstream inner wall is positioned between the upstream outer wall and the gear. An upstream flow channel is formed between the upstream inner wall and the upstream outer wall. The downstream portion of the baffle includes a downstream inner wall and a downstream outer wall separated from the gear. The downstream inner wall is positioned between the downstream outer wall and the gear. A downstream flow channel is formed between the downstream outer wall and the downstream inner wall.

The assembly of the preceding paragraph can optionally include, additionally and/or alternatively, any one or more of the following features, configurations and/or additional components.

An annular band can be disposed between and/or connecting the upstream portion and the downstream portion, wherein the annular band is positioned radially outward from a radially outer end of the gear.

The annular band includes a plurality of openings extending radially through the annular band, wherein the plurality of openings in the annular band are disposed about a circumference of the annular band, wherein the plurality of openings in the annular band fluidly connects the gear to the compartment.

The inner wall of the upstream portion comprises a first series of openings formed therein, wherein the first series of openings fluidly connect the first flow channel with the gear.

The inner wall of the downstream portion comprises a second series of openings formed therein, wherein the second series of openings fluidly connect the second flow channel with the gear.

The upstream portion and the downstream portion are fixedly attached to the housing.

Teeth disposed on a radially outer end of the gear, a gear web connected to and extending radially inward from the teeth, and a hub disposed radially inward and connected to the gear web, the hub disposed about a centerline axis about which the gear is configured to rotate.

An upstream seal element connected to and extending radially inward from the upstream portion of the baffle, wherein the upstream seal element forms a first sealing interface with a hub of the gear and/or a downstream seal element connected to and extending radially inward from the downstream portion of the baffle, wherein the downstream seal element forms a second sealing interface with a hub of the gear.

An upstream seal element connected to and extending radially outward from a hub of the gear, wherein the upstream seal element forms a first sealing interface with the upstream portion of the baffle and/or a downstream seal element connected to and extending radially outward from the hub of the gear, wherein the downstream seal element forms a second sealing interface with the upstream portion of the baffle.

A method of managing air and oil within a bearing compartment of a gas turbine engine includes rotating a gear of the gas turbine engine about a centerline axis. A first flow circulation is guided with an upstream portion of a baffle to a web of the gear. The baffle is disposed about the gear and includes an upstream portion and a downstream portion. The upstream portion disposed on an upstream side of the gear and includes an upstream inner wall and an upstream outer wall. The upstream outer wall is separated from the gear and the upstream inner wall is positioned between the upstream outer wall and the gear. The upstream inner wall and the upstream outer wall form an upstream flow channel therebetween. The downstream portion disposed on a downstream side of the gear opposite from the upstream portion and is connected to the upstream portion. The downstream portion includes a downstream outer wall and a downstream inner wall. The downstream outer wall is separated from the gear. The downstream inner wall is positioned between the downstream outer wall and the gear. The downstream outer wall and the downstream inner wall of the downstream portion form a downstream flow channel therebetween. A second flow circulation is guided with the downstream portion of the baffle to the web of the gear. The first flow circulation is directed radially outward long the gear towards a radially outward end of the gear. The second flow circulation is directed radially outward along the gear towards the radially outward end of the gear.

The method of the preceding paragraph can optionally include, additionally and/or alternatively, any one or more of the following steps, features, configurations and/or additional components.

Oil from within the bearing compartment can be prevented with at least one of the upstream outer wall and the downstream outer wall of the baffle from impinging onto the gear.

Oil cab be flung from the rotating gear and through a plurality of openings in an annular band of the baffle, wherein the annular band is disposed between and connects the upstream portion and the downstream portion of the baffle, wherein the annular band is positioned radially outward from the radially outer end of the gear.

The first flow circulation can be passed through a first series of openings formed in the upstream portion of the baffle, wherein the first series of openings fluidly connect the first flow channel with the gear and/or the second flow circulation can be passed through a second series of openings formed in the downstream portion of the baffle, wherein the second series of openings fluidly connect the first flow channel with the gear.

A first sealing interface can be formed between the hub of the gear and an upstream seal element connected to and extending radially inward from the upstream portion of the baffle and/or a second sealing interface can be formed between the hub of the gear and a downstream seal element connected to and extending radially inward from the downstream portion of the baffle.

A first sealing interface can be formed between the upstream portion of the baffle and an upstream seal element connected to and extending radially outward from the hub of the gear and/or a second sealing interface can be formed between the downstream portion of the baffle and a downstream seal element connected to and extending radially outward from the hub of the gear.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly for a compartment of a gas turbine engine, the assembly comprising:
    a housing defining a portion of the compartment;
    a gear disposed within the compartment and connected to a rotary shaft; and
    a baffle disposed about the gear, the baffle comprising:
        an upstream portion disposed on an upstream side of the gear, the upstream portion comprising:
            an upstream outer wall separated from the gear; and
            an upstream inner wall positioned between the upstream outer wall and the gear, the upstream inner wall and the upstream outer wall of the upstream portion forming an upstream flow channel therebetween; and
        a downstream portion disposed on a downstream side of the gear opposite from the upstream portion, the downstream portion connected to the upstream portion and comprising:
            a downstream outer wall separated from the gear; and
            a downstream inner wall positioned between the downstream outer wall and the gear, the downstream outer wall and the downstream inner wall of the downstream portion forming a downstream flow channel therebetween.

2. The assembly of claim 1, further comprising an annular band disposed between and connecting the upstream portion and the downstream portion, wherein the annular band is positioned radially outward from a radially outer end of the gear.

3. The assembly of claim 2, wherein the annular band includes a plurality of openings extending radially through the annular band, wherein the plurality of openings in the annular band are disposed about a circumference of the annular band, wherein the plurality of openings in the annular band fluidly connects the gear to the compartment.

4. The assembly of claim 1, wherein the inner wall of the upstream portion comprises a first series of openings formed therein, wherein the first series of openings fluidly connect the first flow channel with the gear.

5. The assembly of claim 1, wherein the inner wall of the downstream portion comprises a second series of openings formed therein, wherein the second series of openings fluidly connect the second flow channel with the gear.

6. The assembly of claim 1, wherein the upstream portion and the downstream portion are fixedly attached to the housing.

7. The assembly of claim 1, further wherein the gear comprises:
    teeth disposed on a radially outer end of the gear;
    a gear web connected to and extending radially inward from the teeth; and a hub disposed radially inward and connected to the gear web, the hub disposed about a centerline axis about which the gear is configured to rotate.

8. The assembly of claim 1, further comprising:
an upstream seal element connected to and extending radially inward from the upstream portion of the baffle, wherein the upstream seal element forms a first sealing interface with a hub of the gear; and
a downstream seal element connected to and extending radially inward from the downstream portion of the baffle, wherein the downstream seal element forms a second sealing interface with a hub of the gear.

9. The assembly of claim 1, further comprising:
an upstream seal element connected to and extending radially outward from a hub of the gear, wherein the upstream seal element forms a first sealing interface with the upstream portion of the baffle; and
a downstream seal element connected to and extending radially outward from the hub of the gear, wherein the downstream seal element forms a second sealing interface with the upstream portion of the baffle.

10. A method of managing air and oil within a bearing compartment of a gas turbine engine, the method comprising:
rotating a gear of the gas turbine engine about a centerline axis, wherein the gear is disposed in a bearing compartment of the gas turbine engine;
guiding a first flow circulation with an upstream portion of a baffle to a web of the gear, wherein the baffle is disposed about the gear and comprises:
an upstream portion disposed on an upstream side of the gear, the upstream portion comprising:
an upstream outer wall separated from the gear; and
an upstream inner wall positioned between the upstream outer wall and the gear, the upstream inner wall and the upstream outer wall of the upstream portion forming an upstream flow channel therebetween; and
a downstream portion disposed on a downstream side of the gear opposite from the upstream portion, the downstream portion connected to the upstream portion and comprising:
a downstream outer wall separated from the gear; and
a downstream inner wall positioned between the downstream outer wall and the gear, the downstream outer wall and the downstream inner wall of the downstream portion forming a downstream flow channel therebetween;
guiding a second flow circulation with the downstream portion of the baffle to the web of the gear;
directing the first flow circulation radially outward long the gear towards a radially outward end of the gear; and
directing the second flow circulation radially outward along the gear towards the radially outward end of the gear.

11. The method of claim 10, further comprising preventing, with at least one of the upstream outer wall and the downstream outer wall of the baffle, oil from within the bearing compartment from impinging onto the gear.

12. The method of claim 10, further comprising flinging oil from the rotating gear and through a plurality of openings in an annular band of the baffle, wherein the annular band is disposed between and connects the upstream portion and the downstream portion of the baffle, wherein the annular band is positioned radially outward from the radially outer end of the gear.

13. The method of claim 10, further comprising:
passing the first flow circulation through a first series of openings formed in the upstream portion of the baffle, wherein the first series of openings fluidly connect the first flow channel with the gear; and
passing the second flow circulation through a second series of openings formed in the downstream portion of the baffle, wherein the second series of openings fluidly connect the first flow channel with the gear.

14. The method of claim 10, further comprising:
forming a first sealing interface between the hub of the gear and an upstream seal element connected to and extending radially inward from the upstream portion of the baffle; and
forming a second sealing interface between the hub of the gear and a downstream seal element connected to and extending radially inward from the downstream portion of the baffle.

15. The method of claim 10, further comprising:
forming a first sealing interface between the upstream portion of the baffle and an upstream seal element connected to and extending radially outward from the hub of the gear; and
forming a second sealing interface between the downstream portion of the baffle and a downstream seal element connected to and extending radially outward from the hub of the gear.

* * * * *